(12) United States Patent
Aquino Maier et al.

(10) Patent No.: US 11,422,239 B2
(45) Date of Patent: Aug. 23, 2022

(54) LIDAR SENSOR FOR A LIDAR SYSTEM

(71) Applicant: Robert Bosch GmbH, Stuttgart (DE)

(72) Inventors: Daniel Aquino Maier, Stuttgart (DE); Matthias Wichmann, Gaertringen (DE)

(73) Assignee: Robert Bosch GmbH, Stuttgart (DE)

( * ) Notice: Subject to any disclaimer, the term of this patent is extended or adjusted under 35 U.S.C. 154(b) by 468 days.

(21) Appl. No.: 16/709,120

(22) Filed: Dec. 10, 2019

(65) Prior Publication Data

US 2020/0209361 A1 Jul. 2, 2020

(30) Foreign Application Priority Data

Dec. 21, 2018 (DE) ...................... 10 2018 222 721.7

(51) Int. Cl.
*G01S 17/08* (2006.01)
*G01S 7/481* (2006.01)

(52) U.S. Cl.
CPC .......... *G01S 7/4817* (2013.01); *G01S 7/4811* (2013.01); *G01S 17/08* (2013.01)

(58) Field of Classification Search
CPC . G01S 7/4817; G01S 7/08; G01S 7/42; G01S 7/4811
See application file for complete search history.

(56) References Cited

U.S. PATENT DOCUMENTS

| | | | |
|---|---|---|---|
| 10,353,075 B2 * | 7/2019 | Buskila | G01S 7/486 |
| 2009/0237784 A1 | 9/2009 | Cook | |
| 2015/0340841 A1 * | 11/2015 | Joseph | H01S 5/04257 372/50.12 |
| 2017/0176579 A1 * | 6/2017 | Niclass | G01S 17/10 |
| 2018/0088236 A1 | 3/2018 | Eichenholz et al. | |
| 2018/0175961 A1 | 6/2018 | Spector et al. | |
| 2022/0050203 A1 * | 2/2022 | David Keilaf | G01S 7/484 |

* cited by examiner

*Primary Examiner* — Tsion B Owens
(74) *Attorney, Agent, or Firm* — Norton Rose Fulbright US LLP; Gerard Messina

(57) ABSTRACT

A LIDAR sensor, including: a transceiver-array, which includes a plurality of optical-transceivers, the transceiver-array being a switched-array photonic integrated-circuit, each of the optical-transceivers being set up to in each instance take in a first scanning-spot in a first field-of-view of the LIDAR sensor; a microlens-array which has a plurality of microlenses, the microlens-array being disposed in an optical path of the LIDAR sensor in front of the transceiver array, one each of the microlenses in the optical-path being situated in front of one each of the optical-transceivers; a lens that is disposed in the optical-path in front of the microlens-array; and an optical-scanning-unit which is equipped to alter an optical-beam-path, that starts from one of the optical-transceivers, so that in each instance, a second scanning-spot in the first field-of-view of the LIDAR sensor is sensed by the optical-transceivers, the first scanning-spots lying between the second scanning-spots.

10 Claims, 4 Drawing Sheets

LIDAR SENSOR FOR A LIDAR SYSTEM

FIELD OF THE INVENTION

The present invention relates to a LIDAR sensor.

BACKGROUND INFORMATION

There are various concepts for LIDAR sensors. First of all, what are referred to as macroscanners are used. In that case, for example, a rotating macromirror has a diameter in the centimeter range. A scanning beam having a diameter in the centimeter range may thus also be guided via this mirror both in the transmit path and in the receive path. This large beam diameter has advantages in terms of maintaining eye safety, since a pupil diameter accepted in the standards is able to capture only a fraction of the beam. Moreover, a larger beam diameter is robust with respect to disturbances such as rain or dust, for example.

Another concept for a LIDAR sensor is to use microscanners. They are small mirrors having a diameter in the millimeter range, typically in the range from 1 to 3 mm, which are produced using MEMS technology and are able to swing in one or two axes to thus deviate a beam. The advantages here are the small size and the lack of macroscopically moved elements. The small mirror diameter has a negative effect on robustness and eye safety. In addition, it is difficult to implement these micromirror-based systems coaxially, which means that the transmit path and the receive path take an identical optical course. This is because the micromirror restricts the receiving aperture too much, and not enough photons are able to be collected.

LIDAR sensors are also known which are barrel-shaped (Velodyne), shoebox-shaped (Valeo Scala) or can-shaped (Velodyne Puck). Various so-called solid state systems (SSS), that is, systems without mechanical movement for the beam deviation, are currently being developed. In addition to reduced costs, these systems may likewise have advantages, e.g., in terms of vibrations, which play a role, inter alia, in the automotive sector.

An SSS approach is based on a beam deviation through what are referred to as optical phased arrays (OPAs). Here, the phase of individual antenna elements of an antenna array on a photonic chip is adjusted in such a way that the superposition of the partial waves of all antenna elements has an intensity maximum in one preferred direction. Great challenges when using this approach are, among other things, the precise adjustment of the phase for each individual element, as well as secondary orders of the interference pattern radiated in other directions.

LIDAR systems measure the distance of an object, for example, by a direct measurement of the transit time (time of flight) of the emitted light pulse. A laser source emits a light pulse that is diverted via a suitable unit onto an object. The object reflects the light pulse, the reflected light pulse being measured and evaluated by a detector. Utilizing the time of flight measurement, the system is able to determine the transit time based on the moments the light pulse is emitted and received, and to determine the distance of the object from the transmitter/detector based on the light velocity. Other methods are based on an indirect time of flight measurement by modulation of the light intensity or the light frequency itself. One approach to be included is the combination of frequency modulation and coherent detection (coherent frequency modulated continuous wave (FMCW)).

SUMMARY OF THE INVENTION

The LIDAR sensor according to the present invention includes: a transceiver array which contains a plurality of optical transceivers, the transceiver array being a switched array photonic integrated circuit, each of the optical transceivers being set up to in each instance take in a first scanning spot in a first field of view of the LIDAR sensor; a microlens array which has a plurality of microlenses, the microlens array being disposed in an optical path of the LIDAR sensor in front of the transceiver array, one each of the microlenses in the optical path being situated in front of one each of the optical transceivers; a lens that is disposed in the optical path in front of the microlens array; and an optical scanning unit which is equipped to alter an optical beam path, that starts from one of the optical transceivers, in such a way that in each instance a second scanning spot in the first field of view of the LIDAR sensor is sensed by way of the optical transceiver, the first scanning spots lying between the second scanning spots.

The transceiver array is set up in particular to couple one of the optical transceivers of the transceiver array to a light source, especially a laser, so that the optical transceiver emits light. In this context, the light emitted by the respective optical transceiver is a scanning beam generated by the LIDAR sensor. The scanning beam traverses the optical path of the LIDAR sensor and is radiated into an area surrounding the LIDAR sensor. In addition, the transceiver array is set up to couple one of the optical transceivers of the transceiver array to a receiving sensor, which is suitable for detecting the reflected light captured by the respective optical transceiver. In particular, one of the optical transceivers of the transceiver array is coupled both to the light source and to the receiving sensor. Specifically, only one of the optical transceivers is therefore ever capable of emitting and receiving light. The transceiver array may include the light source and the associated receiving sensor.

Namely, a single one of the optical transceivers is therefore always used to emit and receive light, the specific optical transceiver receiving the light which was emitted previously as a scanning beam by the same optical transceiver, provided it was reflected in the surround field of the LIDAR sensor.

The transceiver array is what is commonly known as a switched array photonic integrated circuit, and may be a one-dimensional or a two-dimensional array. In the case of a one-dimensional array, all the optical transceivers of the transceiver array are disposed in one row. In the case of a two-dimensional array, several rows of optical transceivers are situated side-by-side.

The microlens array includes a plurality of microlenses, the microlens array may have as many microlenses as the transceiver array has optical transceivers. The microlens array is situated in an optical path of the LIDAR sensor. That means that the scanning beam, which is emitted by any given transceiver of the transceiver array, passes through the microlens array in order to be radiated into the area surrounding the LIDAR sensor. In each case one of the microlenses of the microlens array is situated in front of one of the optical transceivers. In other words, the scanning beam emitted by any given transceiver always passes through an associated microlens of the microlens array.

The lens is disposed in the optical path in front of the microlens array. The lens may completely cover the microlens array in the optical path. This means that in every case, the light emitted by the transceiver array passes through the lens as well, regardless of which of the optical transceivers emitted the scanning beam. In other words, the scanning beam which is emitted by the transceiver array passes first through the microlens array and then the lens, before it is radiated into an area surrounding the LIDAR sensor.

The transceiver array may be disposed in a first plane. In other words, all transceivers lie in the first plane. The microlens array may be disposed in a second plane. In other words, all microlenses lie in the second plane. The lens may be situated in a third plane. That means that an optical axis of the lens is perpendicular to the third plane. The first plane, the second plane and the third plane may be parallel to each other.

The optical scanning unit is equipped to alter an optical beam path, which starts from one of the optical transceivers, in such a way that in each instance a second scanning spot in the first field of view of the LIDAR sensor is taken in by way of the optical transceivers, the first scanning spots being different from the second scanning spots. In other words, a direction of the scanning beam is altered by the optical scanning unit. Consequently, a scanning beam emitted by one of the optical transceivers is directed selectively in different directions, and is thus capable of scanning further spots in the surroundings of the LIDAR sensor and converting them into scanning spots. At the same time, however, the direction of the scanning beam is only altered to the extent that the spot in the surroundings of the LIDAR sensor scanned after the change in the beam direction lies between two spots which would be scanned in each instance by adjacent transceivers if the scanning beam were not altered. Thus, by a combination of the first scanning spots which were covered prior to a change in the beam direction, and the second scanning spots which were covered after a change in the beam direction, a density of the scanning spots, by which the first field of view of the LIDAR sensor is imaged, is increased. This means that a scanning resolution of the LIDAR sensor is improved owing to the scanning unit, as different spots in the area surrounding the LIDAR sensor are scanned in time sequence by a single transceiver.

A LIDAR sensor is therefore created which, by way of the individual optical transceivers, is able to sense different spots in an area surrounding the associated LIDAR system. A field of view of the LIDAR sensor is scanned by activating the different optical transceivers in time sequence, and thus light is emitted and reflected light is detected in each instance by successive optical transceivers in time sequence.

Consequently, a compact scanning LIDAR sensor is obtained which is able to dispense with macroscopically rotating components or reduces the requirements for them sharply. On the other hand, present LIDAR systems often have the disadvantage that in order to satisfy all demands, e.g., providing a field of view (FoV) of 50°×9°, a resolution of 0.15°×0.15° and a range of 180 m, rotating systems have to be used, which must be assessed critically with respect to service life and space required.

The invention may be utilized for single mode and multimode waveguide structures of the transceiver array. By using a plurality of lasers and/or detectors, the transceiver array may be parallelized, that is, a plurality of pixels in the far field may be read out at the same time. The sampling rate of the overall system is thus increased. The LIDAR sensor may be operated in combination with all time of flight (ToF) measuring methods, as well, e.g., pulsed ToF, indirect ToF, and in combination with FMCW-based time of flight measurements.

Moreover, in order to satisfy present requirements, LIDAR systems are often necessary which sense a surrounding area with more than 500,000 scanning spots and, at the same time, cover an image field of 360°×20°. However, the number of transceivers in a transceiver array necessary for this may lead to high wastage at the array level. Furthermore, because of the integrated antennas, Mach-Zehnder switches and waveguides, the finite pixel size leads to a minimal pixel size in the range of several 10 µm. For several 100,000 pixels, this leads to chip sizes of more than 1 cm and, as a result, higher chip costs and high requirements for objectives which are supposed to cover a large field of view. In the case of single-mode waveguide structures (e.g., TEMOO), the demands on the robustness of the system in terms of shifting are also high, since small shifts in the µm range already lead to losses in efficiency. However, this problem is solved by a LIDAR sensor according to the present invention.

The requirements regarding resolution and field of view are thus distributed over various components. Not only are the demands on the individual components reduced, especially with respect to the size and pixel density of the switchable array, but also with respect to the position tolerances of the individual components. At the same time, an active selection of ROIs (regions of interest) in the field of view, which are able to be tracked with higher time/spatial resolution (e.g., for detecting pedestrians), is possible. The concept allows the realization of a platform with low-cost and high-end variants via scaling.

The further descriptions herein delineate further developments of the invention.

The scanning unit may include a linear motion unit which is equipped to shift the transceiver array, the microlens array and/or the lens in a respective associated plane, in order to alter a position of the transceiver array relative to the microlens array or relative to the lens. In this instance, the associated plane is, namely, the first plane, the second plane or the third plane. Thus, the motion unit alters a propagation direction of the scanning beam which is emitted by an optical transceiver. Due to the shift of the transceiver array, the microlens array and/or the lens relative to each other, the spot in the first field of view of the LIDAR sensor which is scanned by one of the transceivers upon emitting and receiving a scanning beam is thus changed. An additional scanning spot is therefore covered owing to the shift of the transceiver array, the microlens array and/or the lens. A resolution with which the first field of view of the LIDAR sensor is scanned may thus be increased. An especially high resolution is therefore attained by the LIDAR sensor, without having to increase a density of the optical transceivers in the transceiver array. With the motion unit, an XY scanner is therefore obtained in order to deviate each beam within the field of view in the far field and consequently to address a higher number of image points, thus, scanning spots. In so doing, the XY scanner moves the transceiver array and/or the microlens array (MLA) and/or the lens, thus, the objective of the LIDAR sensor.

It is also advantageous if the motion unit includes a piezo actuator and/or a MEMS-based positioner to shift the transceiver array, the microlens array and/or the lens. Such elements of the motion unit are stable in terms of mechanical fatigue and wear. A particularly reliable LIDAR sensor may thus be obtained. In this context, a MEMS-based positioner is a positioning unit for shifting the transceiver array, the microlens array and/or the lens based on a microsystem technology. A piezo actuator in this context is a positioning unit for shifting the transceiver array, the microlens array and/or the lens with the aid of a piezo element.

It is also advantageous if the motion unit is equipped to shift the transceiver array, the microlens array and/or the lens selectively in an X-direction or in a Y-direction, the X-direction and the Y-direction being perpendicular to each other. Consequently, resolution of the LIDAR sensor may be improved in effective manner, by sensing the field of view in a matrix. In this context, both the X-direction and the Y-direction lie in the first, second or third plane.

It is likewise advantageous if the LIDAR sensor further includes a control unit that is equipped to drive the motion unit to shift the transceiver array, the microlens array and/or the lens in one continuous motion. If a suitable motion speed of the transceiver array, the microlens array and/or the lens is selected accordingly, then only a minimal shift of the transceiver array, the microlens array and/or the lens takes place within one transmit- and receive interval of an individual transceiver. Consequently, a single scanning spot may still be covered within one transmit- and receive interval, even if the shift takes place simultaneously. Between a following transmit- and receive interval of this transceiver, enough time is able to pass, however, that a further spot in the surround field of the LIDAR sensor may be scanned by the transceiver in order to improve the resolution of the LIDAR sensor. A continuous motion has the advantage that wear of the LIDAR sensor is only minor.

It also may be provided that the LIDAR sensor has a control unit which is equipped to drive the motion unit always to shift the transceiver array, the microlens array and/or the lens after one of the transceivers has passed through a receive interval and a transmit interval, or when each of the transceivers has passed through a receive interval and a transmit interval. Thus, the shift of the transceiver array, the microlens array and/or the lens takes place specifically in reaction to the fact that an individual transceiver has passed through a receive interval and a transmit interval, the shift always being triggered when any given transceiver has passed through a receive interval and a transmit interval. Alternatively, the transceiver array, the microlens array and/or the lens is/are shifted specifically in reaction to the fact that all transceivers have passed through a receive interval and a transmit interval. This means that one scanning spot is first taken in by each of the transceivers before a shift of the transceiver array, the microlens array and/or the lens takes place. In this way, either the number of necessary shifting operations may be minimized, or a switching operation to activate different optical transceivers may be minimized.

It is further advantageous if the scanning unit includes a scanner mirror that is mounted in the optical path in front of the lens and is set up to direct a scanning beam, emanating from the transceiver array, in varying directions. In this way, a wider surround field of the associated LIDAR system is able to be scanned by the LIDAR sensor, and coverage of the LIDAR sensor is increased by combining several fields of view of the LIDAR sensor. Such a scanner mirror is also referred to as an angle scanner, the scanner mirror may be implemented as a galvo scanner, MEMS mirror or cardanic mirror. By using the scanner mirror as angle scanner (galvo scanner, MEMS mirror, cardanic mirror), the field of view of the LIDAR sensor may be expanded or the resolution may be increased via small scan angles.

In this context, it is advantageous if the LIDAR sensor is equipped to sense a first field of view in a first period of time by way of the plurality of optical transceivers, and to sense a second field of view in a second period of time by way of the plurality of optical transceivers, a movement of the scanner mirror taking place between the first period of time and the second period of time. In the process, between the first period of time and the second period of time, which may be the scanner mirror is moved in such a way that the first field of view and the second field of view do not overlap. Particularly, however, the scanner mirror may be moved within the first period of time and within the second period of time in such a way that several scanning spots in the respective field of view are taken in by a single optical transceiver. A field of view and a resolution of the LIDAR sensor may thus be increased.

It is also advantageous if the LIDAR sensor is equipped to emit light by way of several of the optical transceivers simultaneously, and/or to detect reflected light by way of several of the optical transceivers simultaneously. To that end, the transceiver array may be coupled to a plurality of light sources and/or a plurality of receiving sensors. Thus, in particular, a selection of several of the optical transceivers of the transceiver array is active, the optical transceivers in each case need not be directly adjacent optical transceivers of the transceiver array, in order to minimize disturbances. Consequently, a time needed to cover a field of view of the LIDAR sensor is decreased. At the same time, the required resolution is able to be maintained. This means that a scanning rate of the LIDAR sensor is increased.

A LIDAR system which includes the LIDAR sensor according to the present invention has all the advantages of the LIDAR sensor of the invention. Moreover, it is advantageous if such a LIDAR system includes a plurality of the LIDAR sensors according to the invention. Thus, a parallelization may take place, and a particularly large field of view may be detected.

In the following, exemplary embodiments of the present invention are described in detail with reference to the accompanying drawings.

DETAILED DESCRIPTION

Figure 1A:
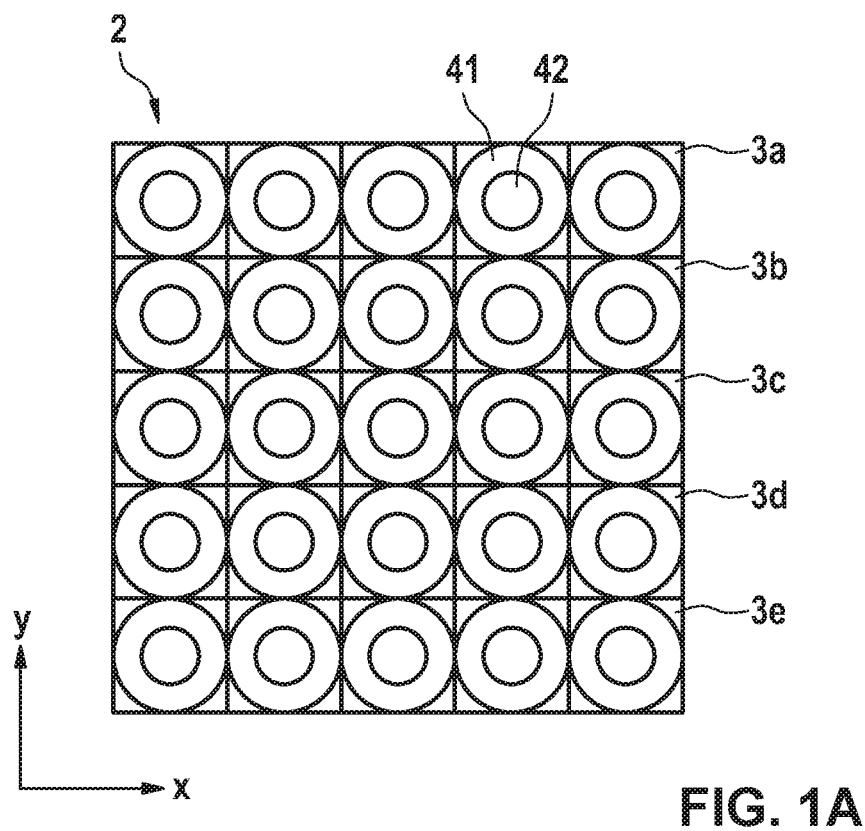
FIG. 1A shows an exemplary representation of a two-dimensional transceiver array.

FIG. 1A shows an exemplary two-dimensional transceiver array 2. Transceiver array 2 has a plurality of optical transceivers 3a, 3b, 3c, 3d, 3e. Transceiver array 2 shown in FIG. 1A is thus made up of 25 optical transceivers 3a, 3b, 3c, 3d, 3e. In this case, five rows of five optical transceivers 3a, 3b, 3c, 3d, 3e each are disposed parallel to each other. The individual transceivers correspond to each other in their structure. Transceiver array 2 is what is referred to as a switched array photonic integrated circuit.

Transceiver array 2 is set up to in each instance couple one of optical transceivers 3a, 3b, 3c, 3d, 3e simultaneously to a light source and to a receiving sensor. That means that only one of optical transceivers 3a, 3b, 3c, 3d, 3e is active at any one time and is able to take in one scanning spot. To that end, when respective optical transceiver 3a, 3b, 3c, 3d, 3e is active, respective active optical transceiver 3a, 3b, 3c, 3d, 3e first passes through a transmit interval and then a receive interval. In addition, optical transceiver 3a, 3b, 3c, 3d, 3e of transceiver array 2 usually includes a light coupler and a switch.

Alternatively, photodetectors are disposed in transceiver array 2, each of optical transceivers 3a, 3b, 3c, 3d, 3e including a photodetector, thus, its own receiving sensor. In this case, one of optical transceivers 3a, 3b, 3c, 3d, 3e is coupled in each instance to a light source, and at the same time, the photodetector of respective optical transceiver 3a, 3b, 3c, 3d, 3e is activated.

For example, if a first optical transceiver 3a is active, then first optical transceiver 3a is coupled to the light source and the receiving sensor. The remaining optical transceivers 3a are inactive and are not coupled to the light source and the receiving sensor. If first optical transceiver 3a is active, first optical transceiver 3a then initially passes through a transmit interval in which a scanning beam is emitted by first optical transceiver 3a, in a manner that an optical pulse generated by the light source is conducted to first optical transceiver 3a, and is emitted by it as a scanning beam. First optical transceiver 3a subsequently passes through a receive interval in which light, that was emitted as a scanning beam by first optical transceiver 3a in the transmit interval and was reflected back to first optical transceiver 3a, is received by first optical transceiver 3a and passed on to the receiving sensor for detection.

To that end, each of optical transceivers 3a, 3b, 3c, 3d, 3e is switchably coupled to the receiving sensor via in each instance a first optical fiber 41, and is switchably coupled to the light source via in each instance a second optical fiber 42. The light source may be a laser. The receiving sensor may be a photodiode.

Figure 1B:
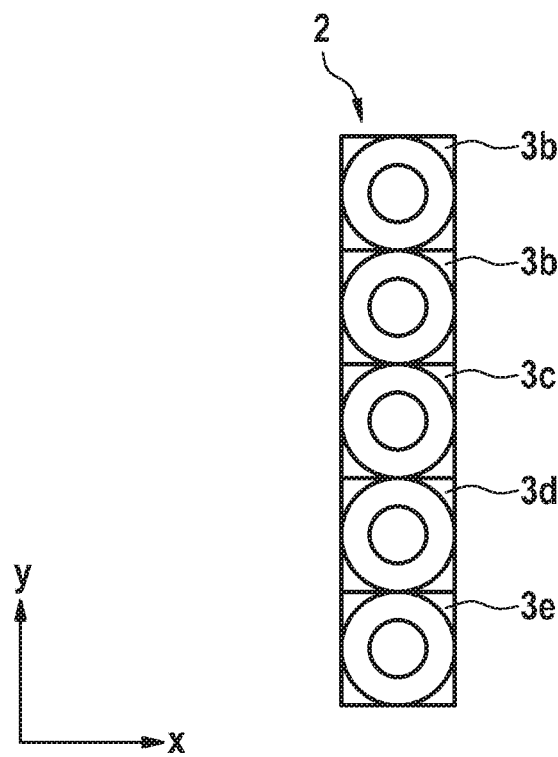
FIG. 1B shows an exemplary representation of a one-dimensional transceiver array.

FIG. 1B shows an exemplary one-dimensional transceiver array 2. Transceiver array 2 has a plurality of optical transceivers 3a, 3b, 3c, 3d, 3e and in structure, corresponds essentially to two-dimensional transceiver array 2. However, transceiver array 2 shown in FIG. 1B is made up of only five optical transceivers 3a, 3b, 3c, 3d, 3e, which are disposed in one row.

It should be understood that the number of optical transceivers of transceiver arrays 2 in FIGS. 1A and 1B is selected merely by way of example. Transceiver array 2 is an optical switching unit.

Figure 2A:
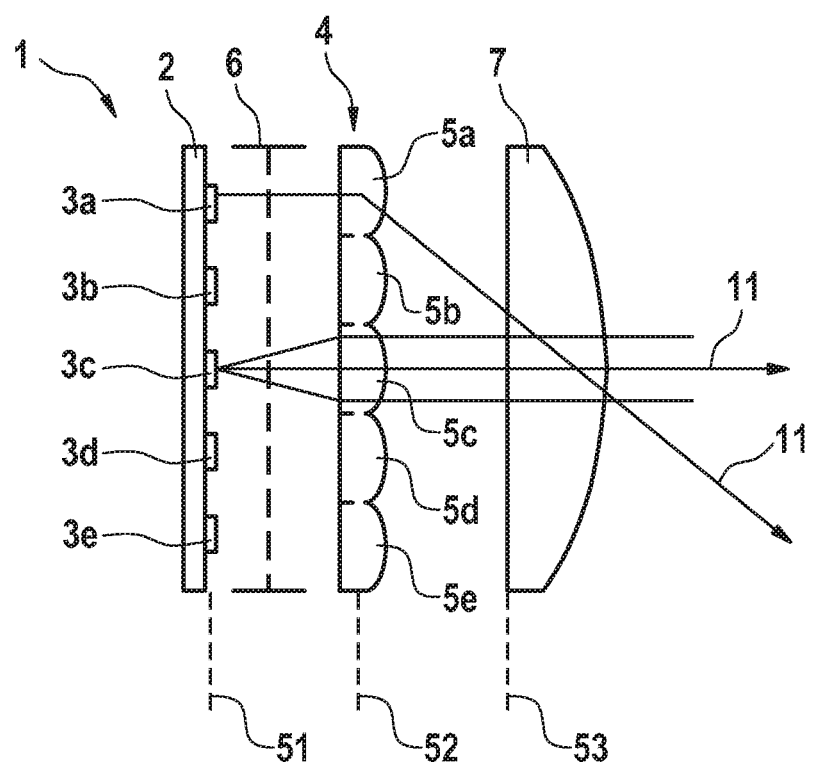
FIG. 2A shows a schematic representation of a LIDAR sensor without a scanning unit.

FIG. 2A shows a schematic representation of a LIDAR sensor 1, whose configuration forms the basis of the LIDAR sensor of the present invention. In this instance, an associated scanning unit 8 is not considered for the time being.

LIDAR sensor 1 includes a two-dimensional transceiver array 2, in which in each case five optical transceivers 3a, 3b, 3c, 3d, 3e are disposed in one row each of transceiver array 2. Two-dimensional transceiver array 2 thus corresponds to transceiver array 2 shown in FIG. 1A. Transceiver array 2 includes a first optical transceiver 3a, a second optical transceiver 3b, a third optical transceiver 3c, a fourth optical transceiver 3d and a fifth optical transceiver 3e.

Transceiver array 2 is disposed in a first plane 51. In other words, all of optical transceivers 3a, 3b, 3c, 3d, 3e of transceiver array 2 lie in one common plane.

A microlens array 4 is disposed in a second plane 52 of LIDAR sensor 1. Microlens array 4 includes a plurality of microlenses 5a, 5b, 5c, 5d, 5e, which lie together in second plane 52. Microlens array 4 therefore includes exactly as many microlenses as transceiver array 2 includes optical transceivers 3a, 3b, 3c, 3d, 3e.

Thus, microlens array 4 includes a first microlens 5a, which is disposed over first optical transceiver 3a. Microlens array 4 also has a second microlens 5b, which is disposed over second optical transceiver 3b. Microlens array 4 further has a third microlens 5c, which is disposed over third optical transceiver 3c. In addition, microlens array 4 has a fourth microlens 5d, which is disposed over fourth optical transceiver 3d. Microlens array 4 also has a fifth microlens 5e, which is disposed over fifth optical transceiver 3e.

Microlens array 4 is situated in an optical path 6 of LIDAR sensor 1 in front of transceiver array 2. In this context, optical path 6 is a path which a scanning beam 11 traverses when it is emitted by one of optical transceivers 3a, 3b, 3c, 3d, 3e in a transmit interval, until it leaves LIDAR sensor 1. Thus, in every case, scanning beam 11 emitted by transceiver array 2 passes through microlens array 4, regardless of the optical transceiver 3a, 3b, 3c, 3d, 3e from which scanning beam 11 was emitted. Depending upon which of optical transceivers 3a, 3b, 3c, 3d, 3e emits scanning beam 11, the microlens 5a, 5b, 5c, 5d, 5e that is situated over active optical transceiver 3a, 3b, 3c, 3d, 3e is traversed by scanning beam 11. Microlens array 4 is therefore situated in the optical path of LIDAR sensor 1 in front of transceiver array 2.

In a third plane 53, which is parallel to first and second planes 51, 52, a lens 7 is disposed. In this instance, lens 7 lies in third plane 53 in such a way that an optical axis of lens 7 is perpendicular to third plane 53. Lens 7 spans entire microlens array 4. Optical path 6 therefore also passes through lens 7. A scanning beam 11, which is emitted by any one of optical transceivers 3a, 3b, 3c, 3d, 3e, passes through lens 7 in every case. In other words, lens 7 is located in optical path 6 in front of microlens array 4.

FIG. 2, by way of example, also shows the direction in which a scanning beam 11 emitted by first optical transceiver 3a propagates after it has passed through first microlens 5a of microlens array 4. In comparison, also shown is a direction in which a scanning beam 11 emitted by third optical transceiver 3c propagates after it has passed through third microlens 5c of microlens array 4. Thus, it is evident that a scanning beam 11 which is emitted by different optical transceivers 3a, 3b, 3c, 3d, 3e is radiated to different points in an environment of LIDAR sensor 1.

Figure 2B:
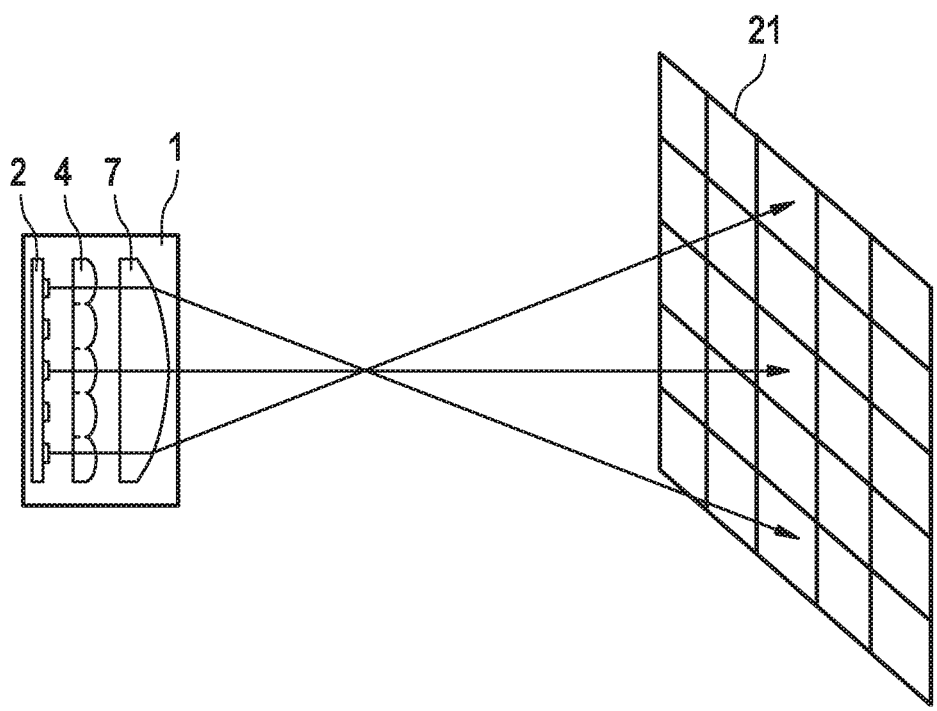
FIG. 2B shows a schematic representation which illustrates an operation of the LIDAR sensor.

This is shown in FIG. 2B, which is a schematic representation that illustrates an operation 1 of LIDAR sensor 1. A propagation direction of scanning beam 11 is a function of the optical transceiver 3a, 3b, 3c, 3d, 3e from which the scanning beam is emitted. Therefore, each individual optical transceiver 3a, 3b, 3c, 3d, 3e scans one spot each in the environment of LIDAR sensor 1. These spots are located in a first field of view 21 of LIDAR sensor 1. This is shown schematically in FIG. 2. Thus, transceiver array 2 has 25 optical transceivers 3a, 3b, 3c, 3d, 3e, for example, by which first field of view 21 is covered in 25 scanning spots. In this instance, each scanning spot is represented by a square in first field of view 21 shown in FIG. 2. The size of the field of view of LIDAR sensor 1 may be selected by an appropriate selection of lens 7, as well.

By suitably activating individual optical transceivers 3a, 3b, 3c, 3d, 3e, the entire first field of view is able to be taken in. In this instance, the first field of view in the example shown in FIG. 2B is covered in 25 scanning spots.

To improve a resolution of LIDAR sensor 1 when scanning first field of view 21, density of the configuration of optical transceivers 3a, 3b, 3c, 3d, 3e could be increased while maintaining the size of transceiver array 2. However, this would have a negative effect on the emission of scanning beam 11 and on the reception of reflected light, since a surface area of each individual optical transceiver 3a, 3b, 3c, 3d, 3e would thereby be reduced.

To nevertheless achieve a comparatively high resolution, LIDAR sensor 1 known from FIGS. 2A and 2B also includes scanning unit 8.

Figure 3A:
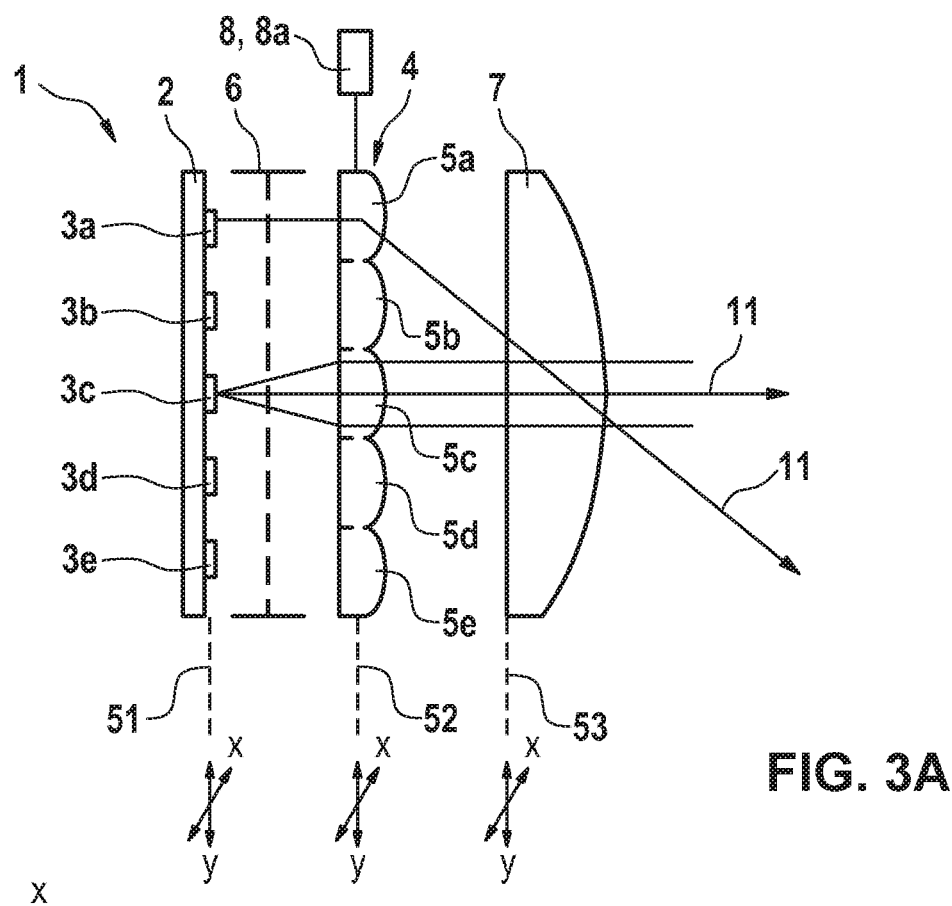
FIG. 3A shows a schematic representation of a LIDAR sensor according to the present invention with scanning unit.

For that, FIG. 3A shows a schematic representation of a LIDAR sensor of the present invention having scanning unit 8. Optical scanning unit 8 is equipped to alter an optical beam path, which starts from one of optical transceivers 3a, 3b, 3c, 3d, 3e, in such a way that in each case a second scanning spot in first field of view 21 of LIDAR sensor 1 is taken in by optical transceivers 3a, 3b, 3c, 3d, 3e, the first scanning spots lying between the second scanning spots. To that end, scanning unit 8 includes a motion unit 8a. It is equipped to shift transceiver array 2, microlens array 4 and/or lens 7 in a respective associated plane, in order to change a position of transceiver array 2 relative to microlens array 4 or relative to lens 7.

The beam path of the light coupled out from optical transceivers 3a, 3b, 3c, 3d, 3e is shown for a central and an outer optical transceiver 3a, 3b, 3c, 3d, 3e, a bundle of rays including the principal ray being shown for central optical transceiver 3c. As known from Fourier optics, a change of location in the focus plane leads to a change of angle in the output of lens 7. As can be seen in FIG. 3A, the result of this is that each of optical transceivers 3a, 3b, 3c, 3d, 3e addresses a different angle of the field of view in the far field, that is, sees a different scanning spot/image point. The light reflected at the object is coupled back again via the same beam path into the same optical transceiver 3a, 3b, 3c, 3d, 3e of the transceiver array and conducted to a detector (PIN-Diode, SPAD, APD), which may be integrated in transceiver array 2. Sequential switching of optical transceivers 3a, 3b, 3c, 3d, 3e of transceiver array 2 allows each object point to be scanned separately.

Theoretically, it would be possible to assign one pixel of the SA-PIC to each required angle in the FOV. In the case of a high resolution, it is necessary to increase the pixels of the SA-PIC number and possibly to reduce the SA-PIC surface. This is not scalable as desired both for technological and for cost reasons. The additional use of scanning elements is also possible.

In the specific embodiment described here by way of example, only microlens array 4 in second plane 52 is shifted. Transceiver array 2 and lens 7 are immovably mounted in LIDAR sensor 1. If microlens array 4 is shifted, the position of transceiver array 2 relative to microlens array 4 will then change. With the shifting of microlens array 4 relative to transceiver array 2, a direction in which a scanning beam 11, emitted by one of optical transceivers 3a, 3b, 3c, 3d, 3e, is beamed from LIDAR sensor 1 changes. Therefore, different spots in first field of view 21 are able to be covered by a single one of optical transceivers 3a, 3b, 3c, 3d, 3e. In the specific embodiment described here, microlens array 4 is shifted. In alternative specific embodiments, either transceiver array 2 or lens 7 is shifted in corresponding manner. Two elements from transceiver array 2, microlens array 4 and the lens may be shifted at any one time relative to the remaining element, as well.

In the specific embodiment of the invention shown in FIG. 3A, microlens array 4 is coupled to motion unit 8a. Motion unit 8a includes a piezo actuator or a MEMS-based positioner to shift microlens array 4. In this case, motion unit 8a is configured in such a way that it is able to shift microlens array 4 selectively in an x-direction or in a y-direction, the x-direction and the y-direction being perpendicular to each other. In this context, both the x-direction and the y-direction lie in second plane 52 belonging to microlens array 4. A distance between transceiver array 2 and microlens array 4 thus remains unchanged. A distance between microlens array 4 and lens 7 also remains unchanged.

Motion unit 8a is driven by a control unit 9, in order to control the shifting of microlens array 4. In so doing, control unit 9 may be set up to coordinate the shift of microlens array 4 timewise with the transmit intervals and the receive intervals of optical transceivers 3a, 3b, 3c, 3d, 3e.

Thus, there are various possibilities as to how a time sequence between the transmit intervals and the receive intervals of optical transceivers 3a, 3b, 3c, 3d, 3e and a shift of microlens array 4 by motion unit 8a is able to be clocked.

Control unit 9 may be set up to drive motion unit 8a always to shift microlens array 4 after one of optical transceivers 3a, 3b, 3c, 3d, 3e has passed through a transmit interval and a receive interval. Microlens array 4 is therefore shifted stepwise. Microlens array 4 is thus always shifted after one scanning spot has been taken in by one of optical transceivers 3a, 3b, 3c, 3d, 3e. In this context, it is advantageous if each of optical transceivers 3a, 3b, 3c, 3d, 3e, when it is active, passes through a number n of transmit intervals and receive intervals before a further optical transceiver 3a, 3b, 3c, 3d, 3e likewise passes through the number n of transmit intervals and receive intervals. Consequently, several scanning spots are covered by one active optical transceiver 3a, 3b, 3c, 3d, 3e before a following optical transceiver 3a, 3b, 3c, 3d, 3e becomes active. At the same time, motion unit 8a is implemented in such a way that microlens array 4 is located in its original position again after being shifted with a frequency corresponding to the number n. For example, microlens array 4 is thus shifted in each case by an equal distance to the right, downward, to the left and then upward in second plane 52.

Further, control unit 9 may be set up to drive motion unit 8a always to shift microlens array 4 after each of optical transceivers 3a, 3b, 3c, 3d, 3e has passed through a receive interval and a transmit interval. Microlens array 4 is therefore shifted stepwise. Microlens array 4 is thus always shifted after one scanning spot has been taken in by one specific optical transceiver 3a, 3b, 3c, 3d, 3e. In this context, each of optical transceivers 3a, 3b, 3c, 3d, 3e, when it is active, passes through exactly one transmit interval and exactly one receive interval, before a further optical transceiver 3a, 3b, 3c, 3d, 3e likewise passes through exactly one transmit interval and exactly one receive interval. When each of optical transceivers 3a, 3b, 3c, 3d, 3e has passed through exactly one transmit interval and exactly one receive interval, microlens array 4 is then shifted. Therefore, exactly one scanning spot is covered by each of optical transceivers 3a, 3b, 3c, 3d, 3e before microlens array 4 is shifted. At the same time, motion unit 8a is implemented in such a way that microlens array 4 is located in its original position again after being shifted with a frequency corresponding to a number n. For example, microlens array 4 is thus shifted in each case by an equal distance to the right, downward, to the left and then upward in second plane 52.

In shifting microlens array 4, microlens array 4 is only ever shifted to the extent that in a consideration of all scanning spots which were taken in by optical transceivers 3a, 3b, 3c, 3d, 3e, adjacent optical transceivers 3a, 3b, 3c, 3d, 3e take in, thus scan, no identical spot in first field of view 21.

Figure 3B:
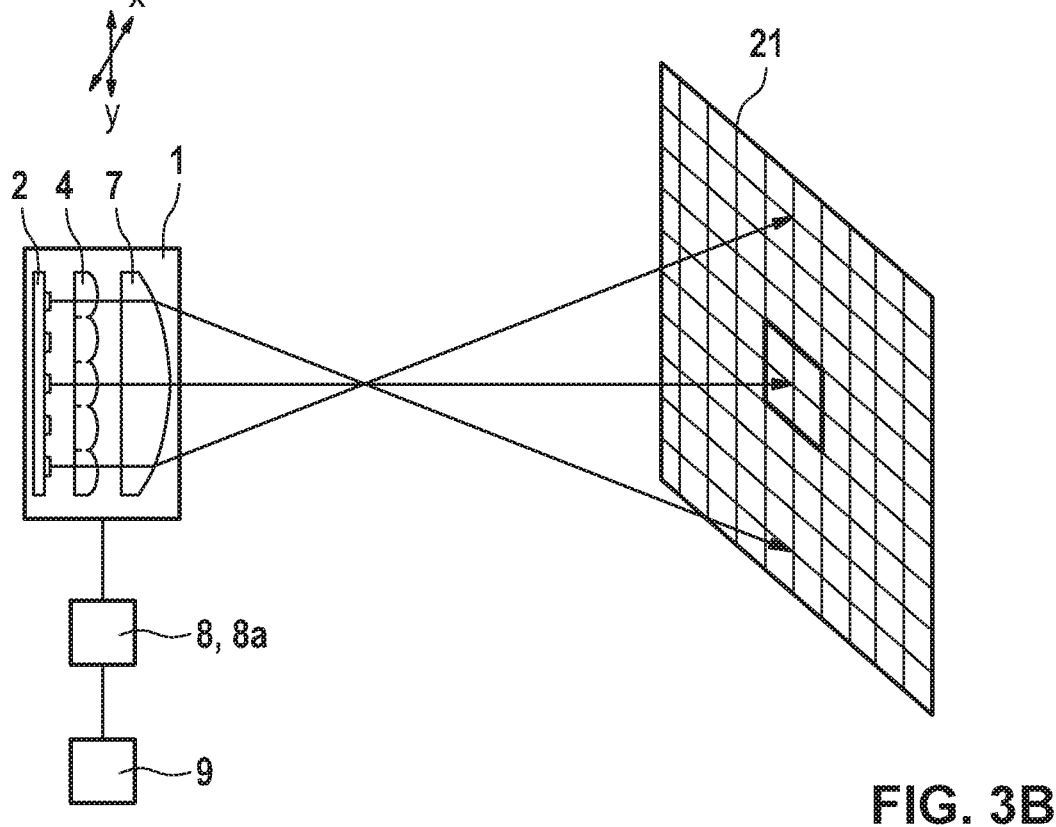
FIG. 3B shows a schematic representation that illustrates the operation of the LIDAR sensor.

In addition, FIG. 3B shows a schematic representation that illustrates the operation of LIDAR sensor 1. As also in the case of the representation shown in FIG. 2B, one specific area of first field of view 21 is covered, e.g., by third optical transceiver 3c. In this instance, however, several scanning spots, e.g., four scanning spots are covered for the same area by third optical transceiver 3c. This holds true in corresponding manner for all optical transceivers 3a, 3b, 3c, 3d, 3e. Resolution of LIDAR sensor 1 is therefore improved compared to the operating method shown in FIG. 2B.

In alternative specific embodiments of the invention, microlens array 4 is not shifted stepwise, but rather continuously. Control unit 9 is thus set up to drive motion unit 8a to shift transceiver array 2, microlens array 4 and/or lens 7 in one continuous motion. In this context, a transmit interval and a receive interval of optical transceivers 3a, 3b, 3c, 3d, 3e are triggered in each instance in reaction to the fact that transceiver array 2, microlens array 4 and/or lens 7 are in a certain position relative to each other.

The additional use of scanning elements, thus, scanning unit 8, as shown in FIGS. 3A and 3B, makes it possible to improve the resolution compared to the exclusive use of transceiver array 2 (the divergence of the beams must be adjusted accordingly via the optical system). In simplified terms, the number of angles addressed in one dimension may be expressed as follows:

$$n_{d\varphi} = n x_{x\text{-pixel-SA-PIC}} * n x_{xy\text{-scan-steps}}$$

This means that the number of scannable scanning spots corresponds to the product of the SA-PIC pixel number (quantity of optical transceivers 3a, 3b, 3c, 3d, 3e) times the number of adjustable xy-scanner states (positions of shiftable microlens array 4). In concrete terms, the demands on one individual component are reduced here by the use of various components.

As example, a system having 20×10 optical transceivers 3a, 3b, 3c, 3d, 3e and a scanner (shiftable transceiver array 2, microlens array 4 or lens 7) having 20×10 scanning angles could already address 400×100 angles, which, given a field of view of 50°×10°, corresponds to a resolution of 0.125°×0.10. The advantage of distributing the demands over various components is that this allows the utilization of scanning systems which, for example, given the use of a single laser, are too slow, or provide too small a scanning area.

Figure 4:
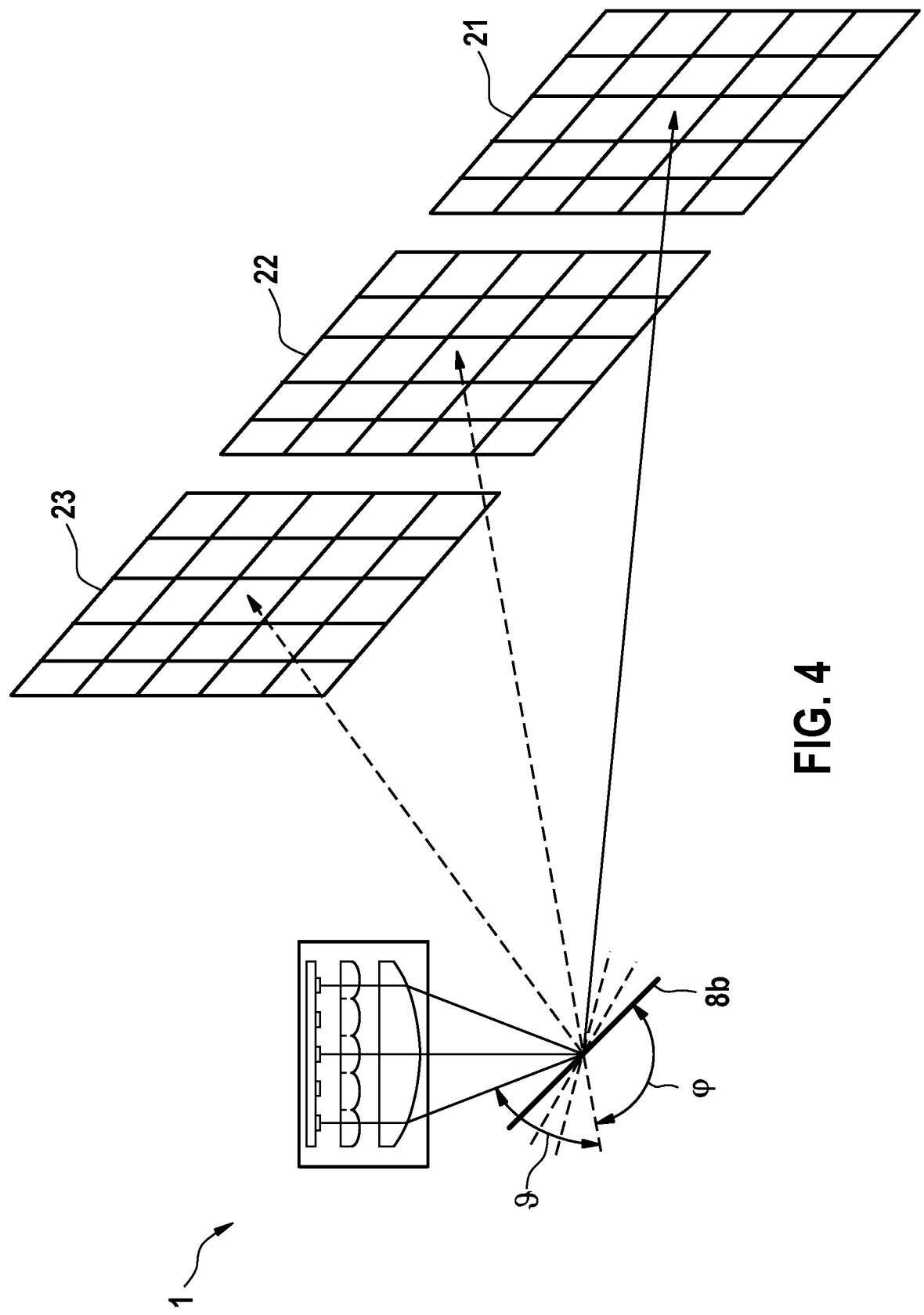
FIG. 4 shows a schematic representation of a LIDAR sensor of the present invention according to a further specific embodiment of the invention.

FIG. 4 shows LIDAR sensor 1 according to a further specific embodiment of the invention. In this instance, LIDAR sensor 1 corresponds essentially to the LIDAR sensor shown in FIG. 2A or 3A, but differs in that scanning unit 8 includes a scanner mirror 8b which is disposed in optical path 6 in front of lens 7, and is set up to direct scanning beam 11, emanating from transceiver array 2, in varying directions. As an option, LIDAR sensor 1 additionally includes motion unit 8a.

As shown by way of example in FIG. 4 for an axis of rotation, the use of an angle scanner downstream of the transceiver unit permits an easy expansion of the entire field of view, without increasing the demands on transceiver array 2 or lens 7. Alternatively, the image-point density is increased via the angle scanner (given suitable adjustment of the divergence of the beam).

In this context, scanner mirror 8b may be swiveled about two axes standing one upon the other, scanner mirror 8b either being swiveled through an angle φ or being tipped through an angle ϑ. The scanning beam emanating from one of optical transceivers 3a, 3b, 3c, 3d, 3e may thus be guided within first field of view 21 in such a way that different scanning spots in first field of view 21 of LIDAR sensor 1 are taken in and therefore scanned by one of transceivers 3a, 3b, 3c, 3d, 3e.

In order to enlarge an area able to be sensed by LIDAR sensor 1, the field of view of LIDAR sensor 1 may be shifted with the aid of scanner mirror 8b. For example, LIDAR sensor 1 is thus set up to detect first field of view 21 in a first period of time by way of the plurality of optical transceivers 3a, 3b, 3c, 3d, 3e. In so doing, the resolution when sensing first field of view 21 may be increased utilizing small movements of scanner mirror 8b and/or with the aid of motion unit 8a.

After first field of view 21 has been scanned completely by the use of all optical transceivers 3a, 3b, 3c, 3d, 3e, scanner mirror 8b is swiveled in such a way that the field of view of LIDAR sensor 1 is shifted so that instead of first field of view 21, a second field of view 22 is able to be detected. The first field of view is thus different from second field of view 22. Second field of view 22 is sensed analogously to first field of view 21. In corresponding manner, a further third field of view 23 is covered, which is different from first and second fields of view 21, 22.

In further specific embodiments of the invention, LIDAR sensor 1 is set up to emit light by way of several of optical transceivers 3a, 3b, 3c, 3d, 3e simultaneously and/or to detect reflected light by way of several of optical transceivers 3a, 3b, 3c, 3d, 3e simultaneously. Thus, for example, two light sources and two receiving sensors are coupled to transceiver array 2. A scanning rate may be increased in this manner. At the same time, it is possible to use a single scanning unit 8 to increase the resolution of LIDAR sensor 1.

In addition to optical scanning units already mentioned, the following components may also be used: liquid lenses, AOM/AOTF, EOM, switchable holograms, LCD-SLMs, refractive liquid crystal scanners or cylindrical lens arrays.

The distance information may be provided in all specific embodiments both as TOF measurement (direct, indirect) or be realized via FMCW.

A scanning process may be further accelerated if a plurality of previously described LIDAR sensors 1 are disposed in a LIDAR system 100.

In addition to the written disclosure above, reference is made explicitly to the disclosure of FIGS. 1 through 4.

What is claimed is:

1. A LIDAR sensor, comprising:
   a transceiver array which includes a plurality of optical transceivers, the transceiver array being a switched array photonic integrated circuit, each of the optical transceivers being set up to in each instance take in a first scanning spot in a first field of view of the LIDAR sensor;
   a microlens array having a plurality of microlenses, the microlens array being disposed in an optical path of the LIDAR sensor in front of the transceiver array, each one of the microlenses in the optical path being situated in front of one each of the optical transceivers;
   a lens disposed in the optical path in front of the microlens array; and
   an optical scanning unit to alter an optical beam path, which starts from one of the optical transceivers, so that in each instance, a second scanning spot in the first field of view of the LIDAR sensor is sensed by the optical transceivers, the first scanning spots lying between the second scanning spots.

2. The LIDAR sensor of claim 1, wherein the scanning unit includes a motion unit to shift the transceiver array, the microlens array and/or the lens in a respective associated plane, so as to alter a position of the transceiver array relative to the microlens array or relative to the lens.

3. The LIDAR sensor of claim 2, wherein the motion unit includes a piezo actuator and/or a MEMS-based positioner to shift the transceiver array, the microlens array and/or the lens.

4. The LIDAR sensor of claim 2, wherein the motion unit is configured to shift the transceiver array, the microlens array and/or the lens selectively in an x-direction or in a y-direction, the x-direction and the y-direction being perpendicular to each other.

5. The LIDAR sensor of claim 2, further comprising:
a control unit to drive the motion unit to shift the transceiver array, the microlens array and/or the lens in one continuous motion.

6. The LIDAR sensor of claim 2, further comprising:
a control unit to drive the motion unit always to shift the transceiver array, the microlens array and/or the lens after one of the transceivers has passed through a receive interval and a transmit interval, or when each of the transceivers has passed through a receive interval and a transmit interval.

7. The LIDAR sensor of claim 1, wherein the scanning unit includes a scanner mirror mounted in the optical path in front of the lens and which is set up to direct a scanning beam, emanating from the transceiver array, in varying directions.

8. The LIDAR sensor of claim 7, wherein the LIDAR sensor is configured to sense the first field of view in a first period of time by the plurality of optical transceivers, and to sense a second field of view in a second period of time by the plurality of optical transceivers, and wherein a movement of the scanner mirror takes place between the first period of time and the second period of time.

9. The LIDAR sensor of claim 1, wherein the LIDAR sensor is configured to emit light by at least two of the optical transceivers simultaneously and/or to detect reflected light by at least two of the optical transceivers simultaneously.

10. A LIDAR system, comprising:
a plurality of LIDAR sensors;
wherein each of the LIDAR sensor includes:
a transceiver array which includes a plurality of optical transceivers, the transceiver array being a switched array photonic integrated circuit, each of the optical transceivers being set up to in each instance take in a first scanning spot in a first field of view of the LIDAR sensor;
a microlens array having a plurality of microlenses, the microlens array being disposed in an optical path of the LIDAR sensor in front of the transceiver array, each one of the microlenses in the optical path being situated in front of one each of the optical transceivers;
a lens disposed in the optical path in front of the microlens array; and
an optical scanning unit to alter an optical beam path, which starts from one of the optical transceivers, so that in each instance, a second scanning spot in the first field of view of the LIDAR sensor is sensed by the optical transceivers, the first scanning spots lying between the second scanning spots.

* * * * *